United States Patent [19]

Kashi et al.

[11] Patent Number: 5,930,380
[45] Date of Patent: Jul. 27, 1999

[54] METHOD AND APPARATUS FOR VERIFYING STATIC SIGNATURES USING DYNAMIC INFORMATION

[75] Inventors: Ramanujan S. Kashi, Bridgewater; Winston Lowell Nelson, Morristown; Gordon Thomas Wilfong, Gillette, all of N.J.

[73] Assignee: Lucent Technologies, Inc., Murray Hill, N.J.

[21] Appl. No.: 08/798,981

[22] Filed: Feb. 11, 1997

[51] Int. Cl.$^6$ .............................. G06K 9/36; G06K 9/62
[52] U.S. Cl. ......................... 382/119; 382/197; 382/215
[58] Field of Search .................................. 382/119, 120, 382/123, 186, 197, 195, 202, 206, 215, 217, 218, 259, 275; 348/161; 434/155

[56] References Cited

U.S. PATENT DOCUMENTS

| 4,028,674 | 6/1977 | Chuang ................................. 340/146.3 |
| 4,985,928 | 1/1991 | Campbell et al. .......................... 382/3 |
| 5,042,073 | 8/1991 | Collot et al. ............................... 382/3 |
| 5,434,928 | 7/1995 | Wagner et al. ......................... 382/187 |
| 5,463,388 | 10/1995 | Boie et al. ............................... 341/33 |
| 5,469,506 | 11/1995 | Berson et al. ............................ 380/23 |
| 5,745,598 | 4/1998 | Shaw et al. ............................. 382/209 |
| 5,802,200 | 9/1998 | Wirtz ..................................... 382/119 |

FOREIGN PATENT DOCUMENTS

2259391 10/1993 United Kingdom .
2271657 4/1994 United Kingdom .

OTHER PUBLICATIONS

F. Leclerc and R. Plamondon, "Automatic Signature Verification: The State of the Art——,", Int. J. of Pattern Recogn. And Art. Intellig. 8, Special Issue) : Automatic Signature Verification, J. Plamondon, Ed., World Scientific Publishing Company (Jun. 1994) 643–660.

R. S. Kashi et al., "On–Line Handwritten Signature Verification Using Stroke Direction Coding," Optical Engineering 35 (Sep. 1996) 2526–2533.

S. Lee and J.C. Pan, "Offline Tracing and Representation of Signatures," IEEE Transactions on Systems, Man, and Cybernetics 22 (Jul./Aug. 1992) 755–771.

G. Boccignone et al., "Recovering Dynamic Information from Static Handwriting," Pattern Recognition 26 (1993) 409–418.

A. Rosenfeld, "Axial representation of shape", Computer Vision, Graphics and Image Processing 33 (1986) 156–173.

H. Sakoe and S. Chiba, "Dynamic Programming Algorithm Optimization for Spoken Word Recognition," IEEE Trans. Acoust., Speech, Sig. Process. ASSP–26 (1978) 43–49.

H. Cardot, M. Revenu, B. Victorri, and M–J. Revillet, "A Static Signature Verification System Based On A Cooperating Neural Networks Architecture," Int. J. of Pattern Recogn. And Art. Intellig. 8, No. 3: Automatic Signature Verification, J. Plamondon, Ed., World Scientific Publishing Company (Jun. 1994) 679–692.

(List continued on next page.)

*Primary Examiner*—Leo H. Boudreau
*Assistant Examiner*—Brian P. Werner

[57] ABSTRACT

In a process of signature verification, an off-line test signature is compared to one or more on-line reference signatures. Dynamic data obtained from the reference signature or signatures may be used to improve the thinning of the test signature. Such data may also be used for segmenting the test signature and sequencing the resulting strokes. In some embodiments, the invention includes evaluating a dynamic error, based at least in part on such sequencing of the test signature. In some further embodiments, the invention includes producing a rendering of at least one on-line reference signature as a two-dimensional image, and evaluating a static error based, at least in part, on shape-matching between the rendered image and the test signature.

11 Claims, 3 Drawing Sheets

OTHER PUBLICATIONS

I. Yoshimura and M. Yoshimura, "Off–Line Verification of Japanese Signtures After Elmination of Background Patterns," Int. J. of Pattern Recogn. And Art. Intellig. 8, No. 3: Automatic Signature Verification, J. Plamondon, Ed., World Scientific Publishing Company (Jun. 1994) 693–708.

R. Sabourin, R. Plamondon, and L. Beauvier, "Structural Interpretatioon of Handwritten Signatures Images," Int. J. of Pattern Recogn. And Art. Intellig. 8, No. 3: Automatic Signature Verification, J. Plamondon, Ed., World Scientific Publishing Company (Jun. 1994) 709–746.

Chi–Jain Wen, et al., "Signature Verification Based on Distortion Measure and Spectral Correlation", SPIE Vol. 2564, pp. 252–260.

Ramanujan S. Kashi, et al., "On–line Handwritten Signature Verification Using Stroke Direction Coding", Op. Eng. 35(9) Sep., 1996, pp. 2526–2533.

Sukham Lee, et al., "Offline Tracing and Representation of Signatures", IEEE, 1992, pp. 755–771.

G. Boccignone, et al., "Recovering Dynamic Information from Static Handwriting", Pattern Recognition; pp. 409–418.

T. J. Chainer et al., Improved Algorithm for the Correction of the Segmentation of Signatures in a Signature Verification System, IBM Technical Disclosure Bulletin, 1985, vol. 27, No. 8, pp. 4655–4656.

Sukhan Lee et al., Offline Tracing and Representation of Signatures, IEEE Transactions on Systems, Man, and Cybernetics, vol. 22, No. 4, pp. 755–771, Aug. 1992.

METHOD AND APPARATUS FOR VERIFYING STATIC SIGNATURES USING DYNAMIC INFORMATION

FIELD OF THE INVENTION

This invention pertains to methods for verifying human signatures. More specifically, this invention pertains to methods that involve comparing a scanned test signature to an on-line reference signature obtained during an enrollment procedure.

ART BACKGROUND

All methods of signature verification involve comparing one or more test signatures to one or more reference signatures that are stored in a database. Often, a reference signature is used that is an average or composite of a set of signatures entered during an enrollment procedure. Methods of signature verification fall generally into two categories. In so-called off-line, or static, methods, the test and reference signatures are treated as static two-dimensional images, and they are compared, using techniques of shape analysis, without reference to dynamic information. Techniques of shape analysis include those based on spatial transforms, such as the fast Fourier transform, Karhunen Loeve transform (KLT), and wavelet techniques. Generally, these and similar techniques are used to extract numerical values of certain predefined features. Error scores are calculated, expressing the difference in value that each feature has between the test signature and the reference signature. Some criterion is provided for rejecting the test signature if its total error score, which takes into account some or all of the individual errors, is too high. A useful discussion of static methods of signature verification can be found in F. Leclerc and R. Plamondon, "Automatic Signature Verification: The State of the Art—1989–1993," *Int. J. of Pattern Recogn. And Art. Intellig.* 8, Special Issue: Automatic Signature Verification, J. Plamondon, Ed., World Scientific Publishing Company (June 1994) 643–660.

In so-called on-line, or dynamic, methods of signature verification, each signature is treated as a temporally sequenced set of points that lie on a two dimensional (2-D) plane. Raw data are provided, as noted below, by a sampling and digitizing device. Algorithms for smoothing the raw, digitized signature are generally employed in order to provide a curve suitable for subsequent analysis. In some dynamic methods of signature verification, features are evaluated and cross-compared between the test and reference signatures. These features may include various purely spatial characteristics such as first and second moments (in the x,y-plane), as well as dynamic characteristics such as average velocities, accelerations, and derivatives of acceleration. A useful discussion of methods of this kind can be found in W. Nelson et al., "Statistical Methods for On-Line Signature Verification," *Int. J. of Pattern Recogn. And Art. Intellig.* 8, Special Issue: Automatic Signature Verification, J. Plamondon, Ed., World Scientific Publishing Company (June 1994) 749–770.

In other dynamic methods of signature verification, each signature is segmented into a temporally ordered sequence of elementary strokes, and the stroke sequence of the test signature is compared to the stroke sequence of the reference signature. A useful discussion of methods of this kind can be found in R. S. Kashi et al., "On-Line Handwritten Signature Verification Using Stroke Direction Coding," *Optical Engineering* 35 (September 1996) 2526–2533.

One advantage that dynamic methods have over static methods of signature verification is that dynamic methods have an additional dimension, i.e. the time dimension, in which signature properties can be characterized. As a consequence, dynamic methods can capture signature characteristics that are inaccessible, or only partially accessible, to static methods. Because such characteristics are often dictated by the idiosyncratic biomechanical properties of human individuals, they can be very useful for improving the accuracy of verification. The dynamic and static features are also complementary in discriminating against forgeries, in that, as a general rule, the more a forger tries to match the spatial pattern, the more difficult it is to also match the dynamic pattern.

One particular such characteristic is the ordering of the discrete strokes that make up a handwritten character. On-line signature data provide an unambiguous, time-ordered segmentation of the characters in a signature. On the other hand, ambiguities often arise during attempts to segment a purely static signature image. Intersections, cusps, inflection points, gaps, and the like can be used as guides for inserting breaks between discrete strokes of a static signature. However, the static information will often be insufficient to resolve ambiguities involving, for example, the relative order of a pair of strokes separated by a gap or a pair of strokes that intersect.

To at least some extent, human beings of a common linguistic background exhibit common tendencies in the way they "naturally" trace the drawing sequences of given line patterns that represent handwriting. These tendencies are derived in part from learned knowledge about handwriting, such as the stroke sequences of individual characters, and derived in part from experience. These tendencies can be summarized by heuristic rules. Thus, a given set of heuristic rules represents a hypothetical, empirical model of a given population's handwriting stroke sequences.

Several investigators have attempted to apply heuristic rules to the segmentation of static signatures. The objective is to resolve ambiguous stroke orderings, using the heuristic rules as a substitute for the lost dynamic information. Such an approach is described in S. Lee and J. C. Pan, "Offline Tracing and Representation of Signatures," *IEEE Transactions on Systems, Man, and Cybernetics* 22 (July/August 1992) 755–771. Another such approach is described in G. Boccignone et al., "Recovering Dynamic Information from Static Handwriting," *Pattern Recognition* 26 (1993) 409–418.

Such approaches based on heuristic rules may be able to capture signature dynamics that are generalized over a large population, but they cannot match the ability of on-line approaches to capture the signature dynamics of individuals in the population.

In fact, there are many applications of signature verification in which dynamic data may be available, at least in principle, for the reference signatures, even though only static test signatures are available for verification. One such application is the verification of signatures on personal checks. Although static methods are useful for this application, their verification accuracy is not good. Even though a bank customer registering his signature could be requested to provide on-line data (using, for example, an instrumented tablet), the art has until now has not used such dynamic data to improve the accuracy of verification of static signatures.

Definitions

As used herein, each of the words listed below has the special meaning indicated:

On-line signature means a human signature captured by a sampling and digitizing device capable of providing spatial and temporal data.

Off-line signature means a human signature as represented by a static image, usually obtained by an optical scanning device.

A reference signature is a signature, or a signature model expressed, e.g., as a set of parameter values, derived from one or more signatures entered by a human subject as part of an enrollment procedure, and stored in a database for subsequent use in verifying test signatures.

A test signature is a signature provided by a human subject for verification, to prove the claimed identify of the signer by establishing a good enough match between the test signature and a previously entered reference signature. A test signature is sometimes referred to as an "unknown signature."

A local feature of a signature is a property identified with a single spatially delineated portion of the signature, such as a single stroke.

A global feature of a signature is a well-defined mathematical quantity identified with the signature that represents some spatial and/or dynamic characteristic of the signature as a whole.

A static feature of a signature is a property obtained from the scanned image of a signature. Static features may, e.g., be global or local. A static feature contains no temporal information.

A dynamic feature of a signature is a property obtained from the signature as acquired by on-line methods. A dynamic feature may, e.g., be global or local. A dynamic feature contains temporal information.

A template signature is a reference signature or composite of reference signatures upon which feature values are to be computed for the purpose of a subsequent comparison to one or more test signatures.

SUMMARY OF THE INVENTION

We have invented a method for using dynamic data acquired, for example, in an enrollment procedure, to improve the accuracy of verification of off-line signatures. In accordance with one aspect of our invention, dynamic data acquired from one or more on-line signatures are used to resolve ambiguities in the stroke ordering of an off-line test signature. In accordance with another aspect of our invention, two-dimensional shape information derived from one or more on-line signatures is used for comparison to an off-line test signature by methods of static shape analysis.

DETAILED DESCRIPTION

Figure 1:
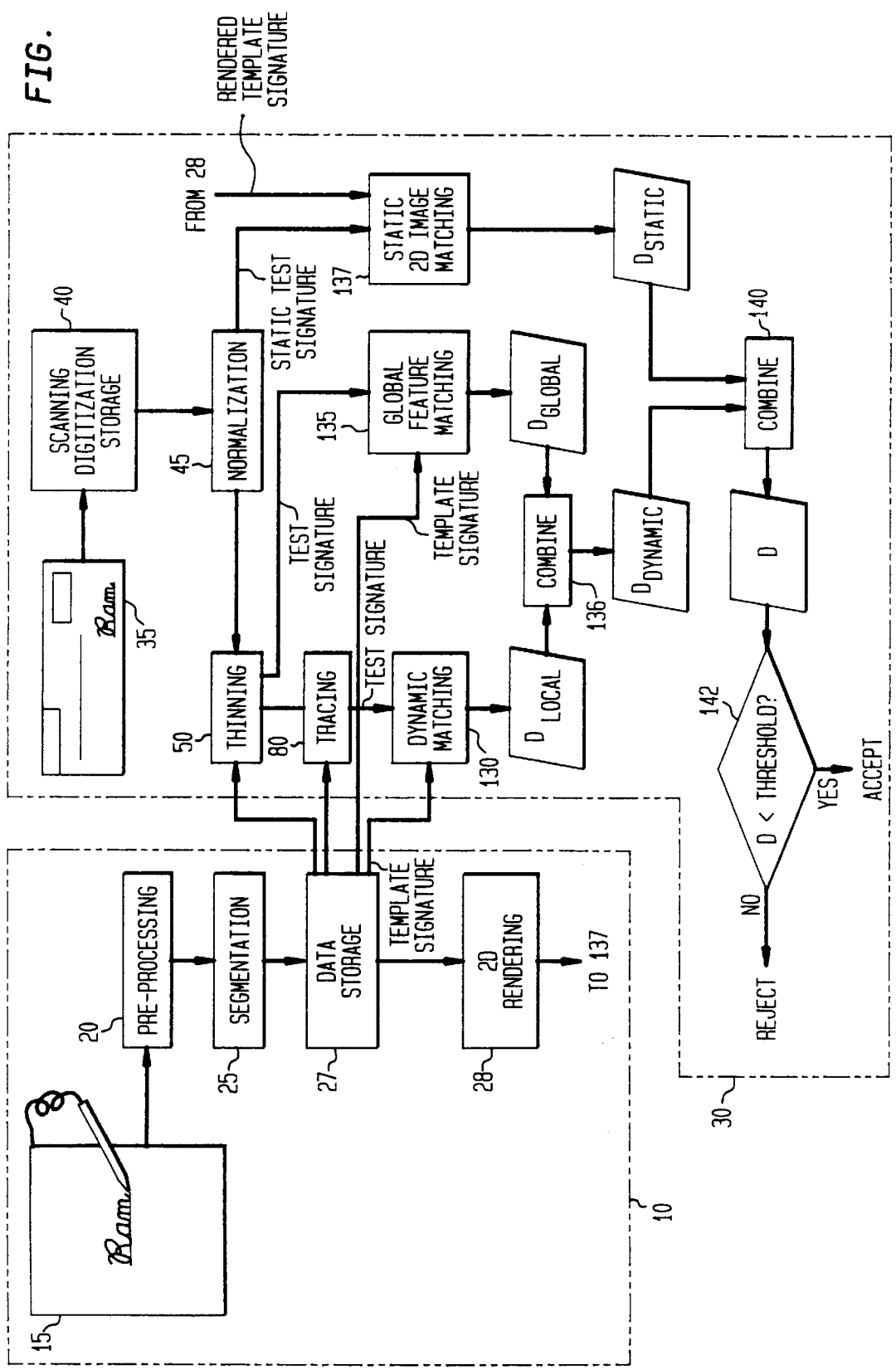
FIG. 1 is a functional block diagram of the invention in an exemplary embodiment.

Described below with reference to FIG. 1 is an exemplary embodiment of the inventive method for verifying signatures of, for example, an authorized customer of a bank or the like. In the enrollment phase 10, a reference signature, which may be one of a reference set of such signatures, is obtained from the customer using an instrumented apparatus 15 that provides a digitized record of the signature for storage in a digital storage medium. Such a digitized record preferably provides the x, y, and time coordinates, and the pen pressure (or at least an indication of "pen up" or "pen down") at each of plural sampled points. One apparatus useful for this purpose is described in U.S. Pat. No. 5,463,388, issued to Robert A. Boie et al. on Oct. 31, 1995.

The subsequent processing of the digitized data, to be described below, is exemplarily performed by a general purpose or special purpose digital computer operating under the control of suitable software.

As represented in block 20 of the figure, the reference signature is then pre-processed. That is, it is smoothed and then normalized for size, position, and rotation, and the origin of the coordinate system that describes it is translated to the centroid of the normalized curve. Many normalization procedures are well-known in the art, and there is no need to describe any of them in detail here. One particular normalization procedure that will be useful in this regard is based on normalizing the Fourier decomposition of the signature. This procedure is described in R. S. Kashi et al., "On-Line Handwritten Signature Verification Using Stroke Direction Coding," *Optical Engineering* 35 (September 1996) 2526–2533. (It should be noted in this regard that some normalization procedures include an element of normalization for shear. Although shear normalization is often used for purposes of handwriting recognition, it is not typically used in signature verification, because shear may in fact provide a useful individual characteristic of the signer.)

Next, as represented in block 25 of the figure, the reference signature is subdivided into time-sequenced, spatially directed segments. One simple approach to segmentation is to subdivide the signature into segments of equal length. However, certain refinements of this simple approach are advantageous for achieving better signature representations. For example, a pen-up to pen-down sequence is usefully treated as a single segment. Portions of the signature having high curvature are advantageously divided into segments of shorter length to provide spatial information of higher resolution for processing the test signature, as explained below. Similarly, the neighborhoods of cusps and intersections are advantageously divided into segments of shorter length to provide higher-resolution information for processing the test signature.

In addition to the segmentation method described above, or in place of that method, the reference signature can be broken into segments at critical points. Critical points may include, for example, pen-up points, pen-down points, cusps, inflection points, points of high curvature, and intersection points. If data representing the stylus pressure are available, such data can be used as an aide for determining where critical points should be located. Additionally, information on velocity, acceleration, and the time-derivative of acceleration can be used as such an aide. For example, a minimum in the speed of the stylus, or an abrupt change in the stylus speed, may give further support to the assignment of a critical point to a certain position along the signature curve.

The results of the segmentation procedure are stored in an appropriate digital data-storage medium 27.

At block 28 of the figure, the reference signature is optionally rendered as a static two-dimensional image for use as a static template signature, as explained below.

In the subsequent enrollment phase 30, a test signature, which may be one of a test set of such signatures, is provided in the form of a static image 35. As represented in block 40 of the figure, this image is scanned, digitized, and stored in a digital data storage medium according to well-known techniques. Like the reference signature, the test signature, as represented in block 45 of the figure, is normalized for size, position, and rotation, and the origin of the coordinate system that describes it is translated to the centroid of the normalized (test signature) curve. As noted, the test signature is not typically normalized for shear.

It should be noted that the reference signature is obtained as a curve that is one pixel wide. (Typically, fuzziness in this curve due to shakiness of the stylus and to digitization error are removed by appropriate interpolation and smoothing algorithms.) By contrast, the test signature is obtained as a curve that has some thickness, i.e., it is more than one pixel wide.

After normalization, the test signature is subjected to a thinning algorithm to reduce it to a one pixel wide curve, as represented in block 50 of the figure. Many thinning algorithms are well-known in the art, and there is no need to describe any of them in detail here. An exemplary thinning algorithm useful in this regard is described in A. Rosenfeld, "Axial representation of shape", *Computer Vision, Graphics and Image Processing* 33 (1986) 156–173.

A typical thinning algorithm etches away at the black pixels of a figure, within a scanning window of a certain width and height, until there remains of the figure only a skeleton one pixel wide. Portions of the figure that contain branches and intersections may be treated erroneously by the thinning algorithm, because black pixels of one branch may be ascribed to a different branch and removed.

In such cases, the performance of the thinning algorithm can be improved by referring to the reference signature. That is, certain distributions of black and white pixels within an appropriate window (which may be, for example, 8 pixels wide and 8 pixels high) can readily be identified as indicating the likely presence of an intersection or branch point.

Figure 2:
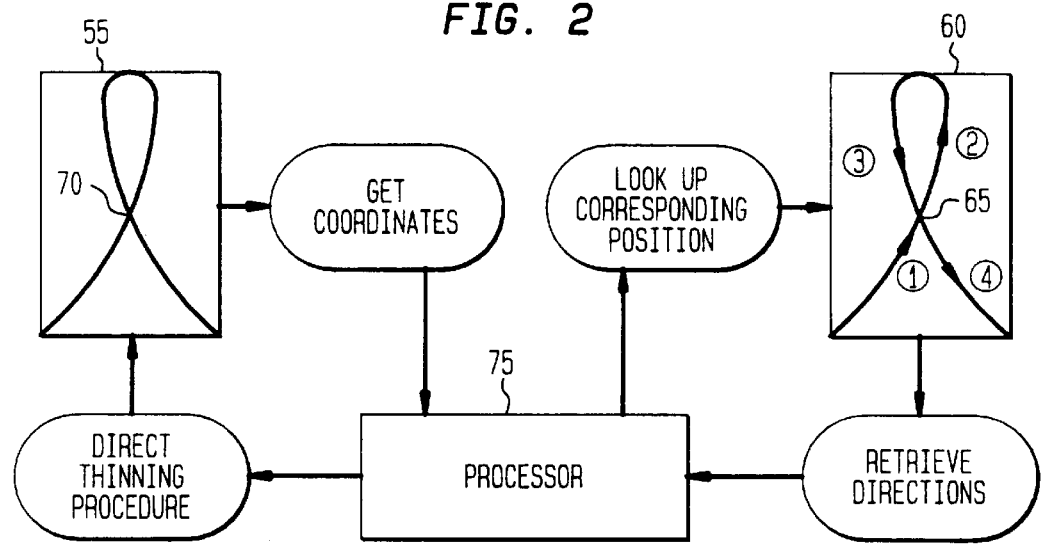
FIG. 2 is a functional block diagram of a sub-process, useful for practicing some embodiments of the invention, in which information obtained from an on-line reference signature is used to improve the thinning of a static test signature.

According to one illustrative scenario, described with reference to FIG. 2, when such a distribution is detected in test signature 55, reference signature 60 is consulted at the point 65 having the same, or nearly the same, coordinates as the suspected branch or intersection point 70 of the test signature. The data processing device 75 that is carrying out the thinning algorithm retrieves from the reference signature the respective directions of the strokes emanating from the given point. The performance of the thinning algorithm is modified in such a way that the resulting thinned strokes of the test signature must emanate in the same, or nearly the same directions as the corresponding strokes of the reference signature. If no correspondence is found, the thinning algorithm can be carried out without any such modification.

Turning back to FIG. 1, after thinning, the test signature is subjected to a tracing procedure 80. The purpose of tracing is to assign a time sequence to all of the sampled points, or to a selected subset of the points, of the test signature. An end point of the test signature having the same, or nearly the same, coordinates as the initial point of the reference signature is assigned the initial time value. Thereafter, the test signature curve is followed according to well-known techniques, and sequential time values are assigned to selected sequential points of the curve.

Figure 3:
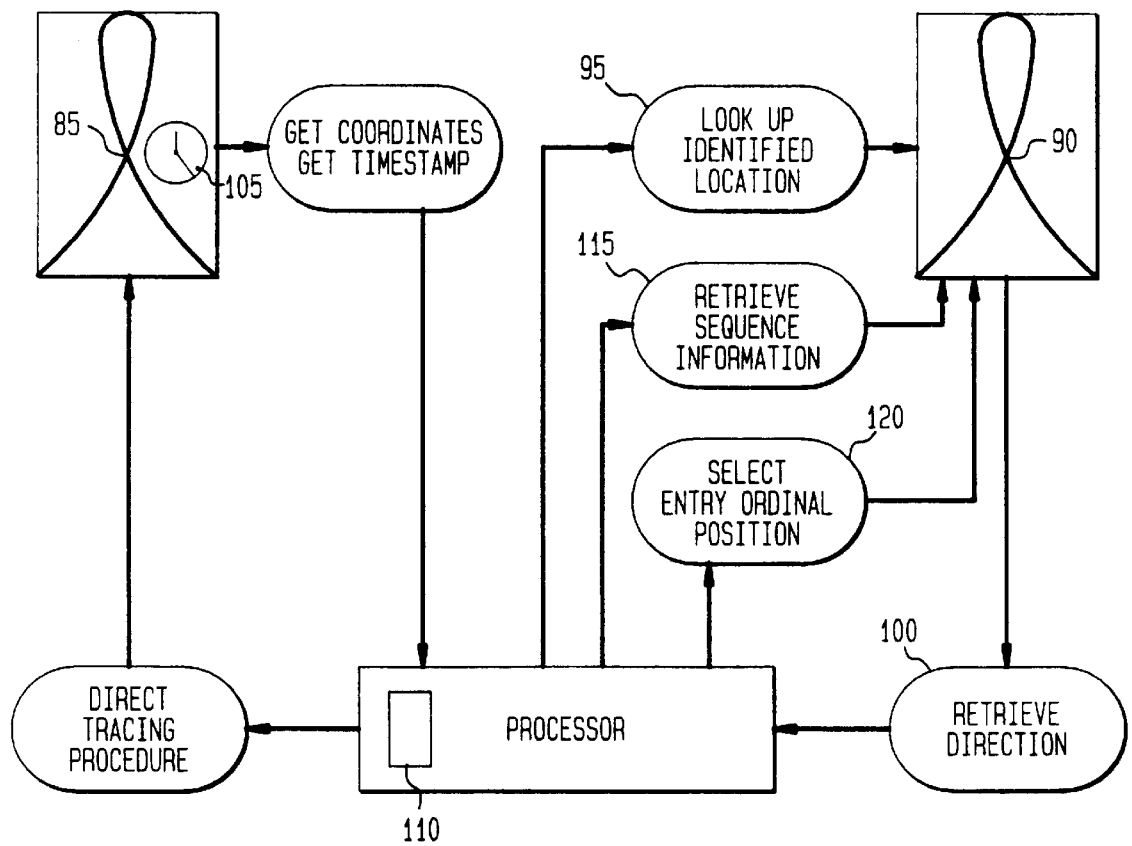
FIG. 3 is a functional block diagram of a sub-process, useful for practicing some embodiments of the invention, in which information obtained from an on-line reference signature is used to improve the tracing of a static test signature.

Turning now to FIG. 3, special procedures are applied when intersections and branch points are encountered during the tracing procedure. The locations of these points may be stored during the preceding thinning procedure, or they may be detected anew in connection with the tracing procedure.

When an intersection or branch point 85 is encountered, reference is made (see block 95 of the figure) to the corresponding point 90 lying at the same, or nearly the same, coordinates of the reference signature. The direction to be taken from the current point in the tracing sequence is read (block 100) from the directional data associated with the reference signature. Significantly, a branch or intersection point will generally be entered more than once. Therefore, a timestamp 105 marking the current entry into such a point is advantageously considered when consulting the reference-signature data. That is, a comparison of stored timestamps 110 of multiple entries into a given point will show whether the current entry is the first, second, or a subsequent entry. Each of these successive entries will generally be associated with a different direction of emergence from the corresponding point of the reference signature.

As represented at blocks 115 and 120 of the figure, the appropriate direction of emergence is selected as belonging to the entry having the pertinent ordinal position. Additionally, it is useful to store the coordinates of the initial and final points of the reference signature in a look-up table (not shown) for consultation during the tracing of the off-line signature. (These coordinates are defined relative to the centroid of the reference signature.) Pen-up and pen-down data are conveniently employed to identify these points. That is, the initial point is defined as the end of the first pen-up segment, and the final point is defined as the beginning of the last pen-up segment. (Alternatively, the initial point is defined as the first point of the first pen-down segment, and the final point is defined as the last point of the last pen-down segment.)

Turning back to FIG. 1, the result of the tracing procedure 80 is the sequencing, or temporal ordering, of strokes of the test signature. Each stroke is a curve portion lying between a selected pair of points. For purposes of subsequent comparison between the reference signature and the test signature, it is desirable for the stroke endpoints on the test signature to be chosen to correspond, at least roughly, to respective points on the reference signature.

Because the test signature has been sequenced, it can be compared to the reference signature using methods that are normally used to compare two signatures that have both been obtained with dynamic data. In particular, dynamic programming methods can be used to find the best correspondence between points or strokes of the reference signature and points or strokes of the test signature, and concurrently to find a distance or error score between the two signatures. Dynamic programming is described, for example, in H. Sakoe and S. Chiba, "Dynamic Programming Algorithm Optimization for Spoken Word Recognition," *IEEE Trans. Acoust., Speech, Sig. Process.* ASSP-26 (1978) 43–49. Such a point-by-point or stroke-by-stroke comparison is an example of comparing local features of the respective signatures.

One such comparison method is described in the Optical Engineering article by R. S. Kashi et al., cited above. The method described there is referred to as stroke-direction coding (SDC). Briefly, SDC treats each signature as a time-ordered concatenation of a fixed number of strokes, and derives information about the spatial orientations of these strokes. In a coding stage, the normalized signature is segmented into a number k of time-ordered links, and the stroke direction of each link is assigned the closest of a fixed number of quantized values ranging from 0 to M. (A typical value for M is 15.) Thus, the SDC representation of a given signature is a vector C, each of whose components represents the (quantized) stroke direction of a given one of the links.

Due to natural inconsistencies during signing, even two signatures by the same individual will contain length differences that lead to misalignment of their respective links. Techniques of dynamic programming are readily applied to find a continuous and monotonic mapping from the links of one signature to the links of the other that minimizes an appropriately defined distance between the two signatures. The resulting minimal distance is taken as the error D sub local between the two signatures.

When a comparison is carried out between the reference signature and the test signature using SDC, the resulting error D sub local is readily used, either alone or in combination with one or more further error scores, as a criterion for accepting or rejecting the test signature as valid or as a forgery, respectively.

In fact, in many cases it will be advantageous to augment a local error score such as D sub local with an additional error score D sub global that is derived by comparing global features of the respective signatures. Because global information is in some sense complementary to local information, the use of this additional score is likely to increase the accuracy of the verification process, in many cases. Moreover, the global error score will still be available for use in the event of a failure in the computation of the local error score. Indeed, there may be further reasons (such as economy in the use of computational resources) that militate for the use of a global error score alone, in certain situations.

It will be appreciated that whereas some global features, such as total time, can be evaluated only if dynamic data are available, many other global features can be computed from purely spatial information. Some useful shape-related global features that can be computed without dynamic information are: length-to-width ratio, horizontal span ratio, horizontal and vertical centroids (defined relative to the lower left corner of a normalized bounding box), and first moment. A further global feature that may be useful is the histogram of the path-tangent angles of the respective links of the signature. For example, if the circle is divided into eight sectors, then an eight-component feature vector is readily computed that includes, for each component, the number of links that are oriented within the corresponding sector. Yet a further exemplary feature is a histogram of the relative rotations between adjacent links. For example, if the circle is divided into four sectors, then this histogram is readily represented by a corresponding, four-component feature vector.

At block 130 of FIG. 1, a local error score is computed using dynamic information, as described above. As explained in detail above, the thinning of the test signature is improved by considering information about stroke sequence and stroke direction obtained from one or more (on-line) reference signatures. After tracing, the test signature can be treated as a pseudo-on-line signature for the purpose of computing global and local error scores that use at least some dynamic information. At block 135, a global error score, for example, is computed using shape information (and, optionally, also using dynamic information).

The local error score and the global error score are combined, at block 136, to produce the dynamic error score denoted as D sub dynamic. One exemplary combination of D sub local and D sub global, useful in this regard, is sqrt {D sub local sup 2+D sub global sup 2}. Other combinations will be apparent to those skilled in the art.

One significant advantage of the methods described here is that the instrumented apparatus used for enrollment provides a time-sequenced data set that, when rendered, produces an inherently clean template signature image for shape matching to the test signatures.

That is, off-line reference signatures in conventional schemes generally need to be scanned and thinned before features are extracted. Image scanning can produce undesirable artifacts. Moreover, as will be apparent from the above discussion, thinning procedures are subject to ambiguities in the shape of the signature and may result in misleading renditions of the thinned signature.

By contrast, when the reference signature is provided as an on-line signature, it is ready to serve as a (static) template signature after a few relatively reliable processing steps such as smoothing and normalization. After normalization (but not necessarily after tracing and thinning) of the test signature, spatial error scores are readily calculated between this static template signature and the scanned test signature. The static 2D image matching can be done with standard algorithms using, e.g., Fourier transforms or well-known KLT or wavelet techniques.

Thus, it will generally be possible to derive a variety of error scores that reflect, both individually and in combination, dynamic local properties, dynamic global properties, static local properties, and static global properties of the respective reference and test signatures.

We shall use the term D sub static or "static error score" to denote global and/or local error scores, and their combinations, that are based on static image data. We believe that when spatial error scores are calculated with reference to such an inherently clean template signature, they will distinguish between genuine signatures and forgeries with significantly greater accuracy than when they are calculated with reference to conventionally scanned and processed two-dimensional signature images. This will lead to greater robustness in the signature verification process, not only when static and dynamic errors are used together, but also when verification is performed on the basis of a static error score alone.

For example, a static two-dimensional image-matching procedure is performed at block 137 of FIG. 1, leading to the error score D sub static as shown in the figure.

Figure 4:
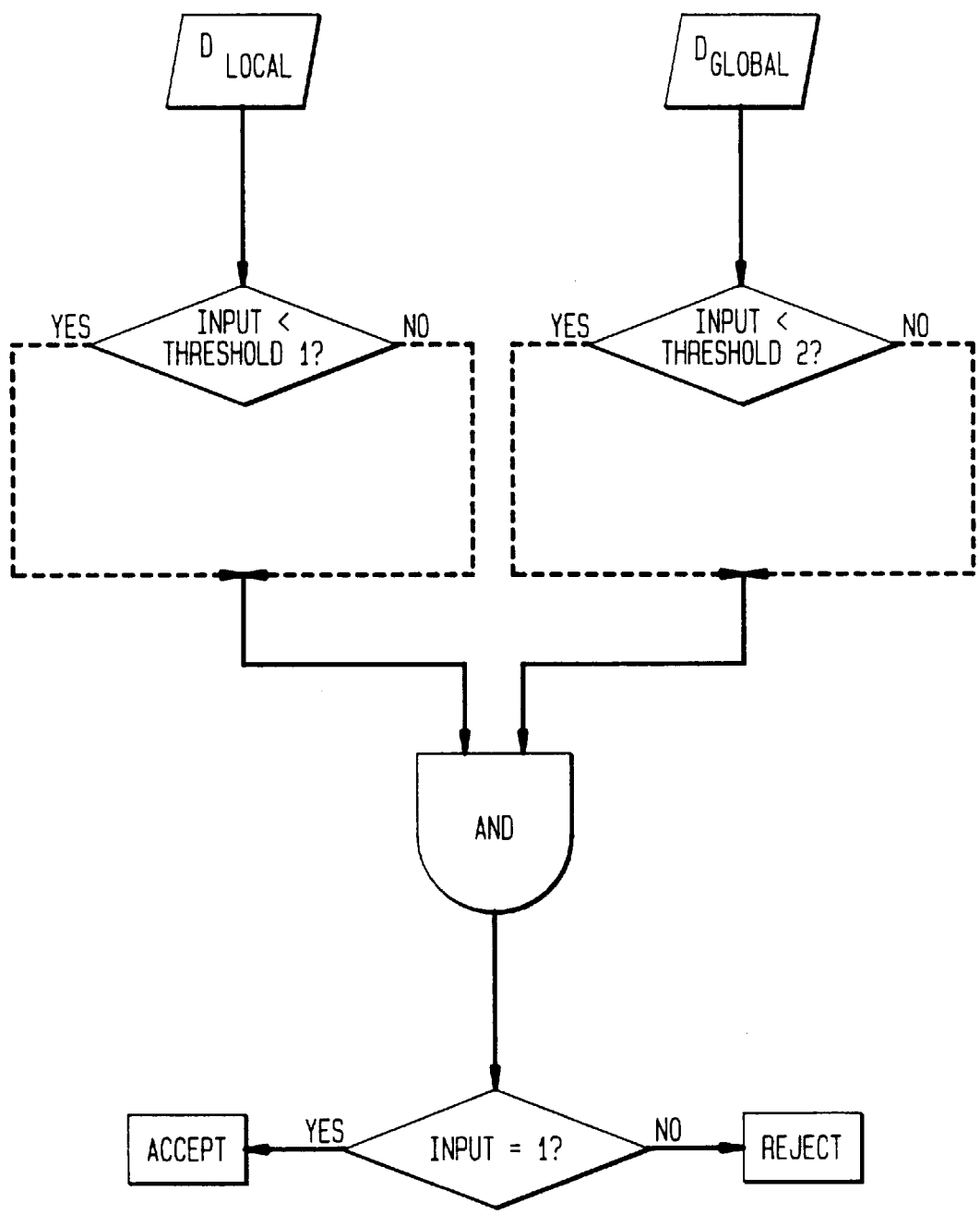
FIG. 4 is a functional block diagram of an exemplary decision procedure for accepting or rejecting a test signature, based on a logical combination of the results of a complementary pair of threshold tests.

The dynamic error score D sub dynamic and the static error score D sub static are readily combined, at block 140 of the figure, into a total error score D by, for example, forming a linear combination with empirically optimized weight coefficients. As is well-known in the art, the acceptance or rejection of a given test signature depends upon one or more threshold tests. In some cases, as shown, for example, in FIG. 1, it may be advantageous to use in test 142 a single threshold applied to the total error score D. In other cases, as shown, for example, in FIG. 4, it may be preferable to apply separate tests, using different thresholds for D sub dynamic and D sub static, respectively. If two tests are used, then acceptance of the test signature as genuine will depend upon some logical combination of the outcomes; i.e., either unanimity (as represented in the figure by AND gate 145) or acceptance in the alternative. It will be readily apparent that with the use of multiple thresholds, more complex criteria for acceptance can also be constructed.

Those skilled in the art will recognize many alternative threshold tests and combinations of such tests that use one or more of these error scores. All of these are intended to lie within the scope of our invention.

We claim:

1. A method for verifying a test signature provided as a static two-dimensional pattern, comprising: digitizing the test signature; comparing the test signature to at least one template signature, thereby to obtain at least one error score; and comparing at least one said error score to a threshold value;

CHARACTERIZED IN THAT the template signature is derived from real-time data obtained during the entry of at least one on-line reference signature, and the method further comprises:

a) providing a sequenced listing of discrete strokes of the template signature, said listing derived from said real-time data, said listing to be referred to as a "stroke ordering;"

b) segmenting the test signature into discrete strokes; and c) before or during the comparing step, sequencing said test signature strokes to correspond, at least in part, to the stroke ordering of the template signature, wherein:

the comparing step is carried out, at least in part, by treating the template signature and the test signature as one-pixel-wide curves each having at least a partial temporal ordering, said treatment leading to an error score $D_{DYNAMIC}$;

the error score $D_{DYNAMIC}$ is evaluated, at least in part, as a combination of error scores $D_{LOCAL}$ and $D_{GLOBAL}$;

the error score $D_{LOCAL}$ is evaluated, at least in part, by matching sequenced strokes of the test signature to sequenced strokes of the template signature in accordance with the methods of dynamic programming; and the error score $D_{GLOBAL}$ is evaluated, at least in part, by calculating at least one global feature on the test signature and on the reference signature, and comparing resulting corresponding global feature values.

2. The method of claim 1, further comprising:

deriving at least one further template signature as a static two-dimensional rendering of at least one said on-line reference signature;

calculating at least one feature, to be referred to as a static feature, on the static template signature;

calculating at least one static feature on the test signature as a static two-dimensional pattern; and comparing at least one static feature value of the static template signature with a corresponding static feature value of the test signature, thereby to obtain at least one further error score, to be referred to as a static error score $D_{STATIC}$.

3. A method for verifying a test signature provided as a static two-dimensional pattern, comprising: digitizing the test signature; comparing the test signature to at least one template signature, thereby to obtain at least one error score; and comparing at least one said error score to a threshold value;

CHARACTERIZED IN THAT the template signature is derived from real-time data obtained during the entry of at least one on-line reference signature, and the method further comprises:

a) providing a sequenced listing of discrete strokes of the template signature, said listing derived from said real-time data, said listing to be referred to as a "stroke ordering;"

b) segmenting the test signature into discrete strokes;

c) before or during the comparing step, sequencing said test signature strokes to correspond, at least in part, to the stroke ordering of the template signature;

d) deriving at least one further template signature as a static two-dimensional rendering of at least one said on-line reference signature;

e) calculating at least one feature, to be referred to as a static feature, on the static template signature;

f) calculating at least one static feature on the test signature as a static two-dimensional pattern; and g) comparing at least one static feature value of the static template signature with a corresponding static feature value of the test signature, thereby to obtain at least one further error score, to be referred to as a static error score $D_{STATIC}$;

wherein;

the step of comparing the test signature to at least one template signature is carried out, at least in part, by treating the template signature and the test signature as one-pixel-wide curves each having at least a partial temporal ordering, said treatment leading to an error score $D_{DYNAMIC}$;

the error score $D_{DYNAMIC}$ is evaluated, at least in part, as a combination of error scores $D_{LOCAL}$ and $D_{GLOBAL}$;

the error score $D_{LOCAL}$ is evaluated, at least in part, by matching sequenced strokes of the test signature to sequenced strokes of the template signature in accordance with the methods of dynamic programming;

the error score $D_{GLOBAL}$ is evaluated, at least in part, by calculating at least one global feature on the test signature and on the reference signature, and comparing resulting corresponding global feature values; and the step of comparing at least one error score to a threshold value comprises combining $D_{DYNAMIC}$ and $D_{STATIC}$ into a single error score D, and comparing D to a threshold value.

4. A method for verifying a test signature provided as a static two-dimensional pattern, comprising: digitizing the test signature; comparing the test signature to at least one template signature, thereby to obtain at least one error score; and comparing at least one said error score to a threshold value;

CHARACTERIZED IN THAT the template signature is derived from real-time data obtained during the entry of at least one on-line reference signature, and the method further comprises:

a) providing a sequenced listing of discrete strokes of the template signature, said listing derived from said real-time data, said listing to be referred to as a "stroke ordering;"

b) segmenting the test signature into discrete strokes;

c) before or during the comparing step, sequencing said test signature strokes to correspond, at least in part, to the stroke ordering of the template signature;

d) deriving at least one further template signature as a static two-dimensional rendering of at least one said on-line reference signature;

e) calculating at least one feature, to be referred to as a static feature, on the static template signature;

f) calculating at least one static feature on the test signature as a static two-dimensional pattern; and g) comparing at least one static feature value of the static template signature with a corresponding static feature value of the test signature, thereby to obtain at least one further error score, to be referred to as a static error score $D_{STATIC}$;

wherein:
the step of comparing the test signature to at least one template signature is carried out, at least in part, by treating the template signature and the test signature as one-pixel-wide curves each having at least a partial temporal ordering, said treatment leading to an error score $D_{DYNAMIC}$;
the error score $D_{DYNAMIC}$ is evaluated, at least in part, as a combination of error scores $D_{LOCAL}$ and $D_{GLOBAL}$;
the error score $D_{LOCAL}$ is evaluated, at least in part, by matching sequenced strokes of the test signature to sequenced strokes of the template signature in accordance with the methods of dynamic programming;
the error score $D_{GLOBAL}$ is evaluated, at least in part, by calculating at least one global feature on the test signature and on the reference signature, and comparing resulting corresponding global feature values; and
the step of comparing at least one error score to a threshold value comprises comparing $D_{DYNAMIC}$ to a first threshold value and comparing $D_{STATIC}$ to a second threshold value.

5. A method for verifying a test signature provided as a static two-dimensional pattern, comprising: digitizing the test signature; comparing the test signature to at least one template signature, thereby to obtain at least one error score; and comparing at least one said error score to a threshold value;

CHARACTERIZED IN THAT the template signature is derived from real-time data obtained during the entry of at least one on-line reference signature, and the method further comprises:

a) providing a sequenced listing of discrete strokes of the template signature, said listing derived from said real-time data, said listing to be referred to as a "stroke ordering;"

b) segmenting the test signature into discrete strokes; and c) before or during the comparing step, sequencing said test signature strokes to correspond, at least in part, to the stroke ordering of the template signature and seeking at least one location of directional ambiguity in the test signature, and responsive to detection of said at least one location of directional ambiguity in the test signature, obtaining from said stroke ordering a listing of directions of strokes emanating from a location in said dynamic template signature corresponding to said at least one location of directional ambiguity in the test signature, and only if such a corresponding location exists, arranging the strokes of said test signature to emanate in substantially a same direction as corresponding strokes of said dynamic template signature;

wherein the comparing step comprises matching sequenced strokes of the test signature to sequenced strokes of the template signature; and wherein said stroke-matching step is carried out by dynamic programming.

6. A method for verifying a test signature provided as a static two-dimensional pattern, comprising digitizing the test signature; comparing the test signature to at least one reference signature, thereby to obtain at least one error score (D); and comparing said at least one error score (D) to a threshold value;

CHARACTERIZED IN THAT a dac template signature is derived from real-time data obtained during an entry of said least one on-line reference signature, wherein the method further comprises:

a) providing and storing, as part of said dynamic template signature, a sequenced listing of discrete strokes of the reference signature, said listing derived from said real-time data, said listing to be referred to as a "stroke ordering;"

b) normalizing the test signature;

c) thinning the test signature, after the step of normalizing, by seeking at least one location of directional ambiguity in the test signature, and responsive to detection of said at least one location of directional ambiguity in the test signature, obtaining from said stroke ordering a listing of directions of strokes emanating from a location in said dynamic template signature corresponding to said at least one location of directional ambiguity in the test signature; and only if such a corresponding location exists, then modifying the step of thinning so that resulting thinned strokes of said test signature emanate in substantially a same direction as corresponding strokes of said dynamic template signature;

d) computing a global error score ($D_{GLOBAL}$) by global feature matching of the tat signature, after it has undergone the step of thinning, with the dynamic template signature;

e) computing a dynamic error score ($D_{DYNAMIC}$), at least in part, from said global error score ($D_{GLOBAL}$);

f) computing combined error score (D), at least in part from said dynamic error score ($D_{DYNAMIC}$); and g) comparing the combined error score (D) with threshold value to either accept or reject the test signature.

7. A method according to claim 6, further comprising:
tracing the test sigma after it has undergone the steps of normalization and thinning, wherein, when an intersection or branch point is encountered, obtaining from said stroke ordering a listing of directions of strokes emanating from a location in said dynamic template signal corresponding to said intersection or branch point; and only if such a corresponding location exists, then modifying the step of tracing so that resulting traced strokes of said test signature emanate in substantially a same direction as corresponding strokes of said dynamic template signature;

computing a local error score ($D_{LOCAL}$) by dynamic matching of the test signature, after it has undergone the step of tracing, with the dynamic template signature; and computing the dynamic error score ($D_{DYNAMIC}$) from said global error score ($D_{GLOBAL}$) and said local error score ($D_{LOCAL}$).

8. A method according to claim 6, further comprising:
deriving a static template signature from said dynamic template signature;

computing a static error score ($D_{STATIC}$) by static 2D image matching of the test signature, after it has undergone the step of normalization, with the static template signature; and computing the combined error score (D) from said dynamic error score ($D_{DYNAMIC}$) and said static error score ($D_{STATIC}$).

9. A method according to claim 8, further comprising:
tracing the test signature after it has undergone the steps of normalization and thinning, wherein, when an intersection or branch point is encountered, obtaining from said stroke ordering a listing of directions of strokes emanating from a location in said dynamic template signature corresponding to said intersection or branch point; and only if such a corresponding location exists, then modifying the step of tracing so that resulting traced strokes of said test signature emanate in substantially a same direction as corresponding strokes of said dynamic template signature;

computing a local error score ($D_{LOCAL}$) by dynamic matching of the test signature, after it has undergone the step of tracing, with the dynamic template signature;

computing the dynamic error score ($D_{DYNAMIC}$) from said global error score ($D_{GLOBAL}$) and said local error score ($D_{LOCAL}$); and computing the combined error score (D) from said dynamic error score ($D_{DYNAMIC}$) and said static error score ($D_{STATIC}$).

10. A method for verifying a test signature provided as a static two-dimensional pattern, comprising digitizing the test signature; comparing the test signature to at least one reference signature, thereby to obtain at least one error score (D); and comparing said at least one error score (D) to a threshold value;

CHARACTERIZED IN THAT a dynamic template signature is derived from real-time data obtained during an entry of said least one on-line reference signature, wherein the method further comprises:

a) providing and storing, as part of said dynamic template signature, a sequenced listing of discrete strokes of the reference signature, said listing derived from said real-time data, said listing to be referred to as a "stroke ordering;"

b) normalizing the test signature;

c) thinning the test signature, after the step of normalizing, by seeking at least one location of directional ambiguity in the test signature, and responsive to detection of said at least one location in the test signature, obtaining from said stroke ordering a listing of directions of strokes emanating from a location in said dynamic template signature corresponding to said at least one location in the test signature; and only if such a corresponding location exists, then modifying the step of thinning so that resulting thinned strokes of said test signature emanate in substantially a same direction as corresponding strokes of said dynamic template signature;

d) computing a global error score ($D_{GLOBAL}$) by global feature matching of the test signature, after it has undergone the step of thinning, with the dynamic template signature;

c) tracing the test signature after it has undergone the steps of normalization and thinning, wherein, when an intersection or branch point is encountered, obtaining from said stroke ordering a listing of directions of strokes emanating from a location in said dynamic template signature corresponding to said intersection or branch point, and only if such a corresponding location exists, then modifying the step of tracing so that resulting traced strokes of said test signature emanate in substantially a same direction as corresponding strokes of said dynamic template signature;

f) computing a local error score ($D_{LOCAL}$) by dynamic matching of the test signature, after it has undergone the step of tracing, with the dynamic template signature; and g) comparing said local error score ($D_{LOCAL}$) to a fit threshold and comparing said global error score ($D_{GLOBAL}$) to a second threshold, wherein the test signature is rejected if either said local error score ($D_{LOCAL}$) is less than said first threshold or said global error score ($D_{GLOBAL}$) is less than said second threshold, or both.

11. A method according to claim 10, further comprising:

h) deriving a static template signature from said dynamic template signature;

i) computing a static error score ($D_{STATIC}$) by static 2D image matching of the test signature, after it has undergone the stop of normalizing, with the static template signature; and j) comparing said static or score ($D_{STATIC}$) to a third threshold, wherein the test signature is rejected if said static error score ($D_{STATIC}$) is less than said third threshold.

* * * * *

UNITED STATES PATENT AND TRADEMARK OFFICE
CERTIFICATE OF CORRECTION

PATENT NO. : 5,930,380
DATED : July 27, 1999
INVENTOR(S) : Ramanujan S. Kashi
Winston Lowell Nelson
Gordon Thomas Wilfong It is certified that error appears in the above-identified patent and that said Letters Patent is hereby corrected as shown below:

Column 11, line 64, "dac" should read --dynamic--.
Column 12, line 22, "tat" should read --test--.
          line 28, "part" should read --part,--.
          line 37, "signal" should read --signature--.
Column 14, line 8, "c)" should read --e)--.
          line 36, "stop" should read --step--.

Signed and Sealed this

Seventh Day of November, 2000

Attest:

Q. TODD DICKINSON

*Attesting Officer*          *Director of Patents and Trademarks*